(12) United States Patent
Gammenthaler et al.

(10) Patent No.: US 9,406,145 B2
(45) Date of Patent: Aug. 2, 2016

(54) MOBILE RADAR AND VISUAL TRACKING COORDINATE TRANSFORMATION

(71) Applicant: APPLIED CONCEPTS, INC., Plano, TX (US)

(72) Inventors: Robert S. Gammenthaler, Princeton, TX (US); Alan B. Mead, Allen, TX (US)

(73) Assignee: APPLIED CONCEPTS, INC., Plano, TX (US)

( * ) Notice: Subject to any disclaimer, the term of this patent is extended or adjusted under 35 U.S.C. 154(b) by 162 days.

(21) Appl. No.: 14/267,639

(22) Filed: May 1, 2014

(65) Prior Publication Data

US 2015/0219758 A1 Aug. 6, 2015

Related U.S. Application Data

(60) Provisional application No. 61/934,680, filed on Jan. 31, 2014.

(51) Int. Cl.
| | |
|---|---|
| *G06K 9/00* | (2006.01) |
| *G06T 7/20* | (2006.01) |
| *G01S 13/60* | (2006.01) |
| *G01S 13/86* | (2006.01) |
| *G01S 13/92* | (2006.01) |
| *G08G 1/04* | (2006.01) |
| *G08G 1/052* | (2006.01) |

(52) U.S. Cl.
CPC ............... *G06T 7/204* (2013.01); *G01S 13/60* (2013.01); *G01S 13/867* (2013.01); *G01S 13/92* (2013.01); *G08G 1/04* (2013.01); *G08G 1/052* (2013.01)

(58) Field of Classification Search
None
See application file for complete search history.

(56) References Cited

U.S. PATENT DOCUMENTS

| | | | |
|---|---|---|---|
| 6,864,832 B2 | 3/2005 | Mende et al. | |
| 7,365,676 B2 | 4/2008 | Mende | |
| 7,548,186 B2 | 6/2009 | Mende et al. | |
| 7,982,660 B2 | 7/2011 | Meinecke et al. | |
| 2007/0185689 A1* | 8/2007 | Muraski ................. | G07C 5/085 702/187 |
| 2013/0151135 A1* | 6/2013 | Aubrey .................... | G08G 1/00 701/118 |
| 2013/0322697 A1* | 12/2013 | Grindstaff ............. | G06T 7/2033 382/107 |

OTHER PUBLICATIONS

Simicon-Service Ltd., Price List effective Mar. 1, 2012.
Multanova, MultaRadar CD, Feb. 26, 2013.
Multanova, Jenoptik TraffiStar S330, Feb. 26, 2013.
Multanova, TraffiStar SR 520, Feb. 26, 2013.
Multanova, TraffiStar SR590, Feb. 26, 2013.
Oculii LLC, Applied Concepts Meeting, General Information, May 6, 2013.
Oculii LLC, Visdar-1000, May 6, 2013.
Polcam, Stalker Phodar Model SE-1, Feb. 26, 2013.
Polcam Smart Eye ST-1, User's Manual, Jul. 2013.

(Continued)

*Primary Examiner* — Weiwen Yang
(74) *Attorney, Agent, or Firm* — Jackson Walker LLP; Christopher J. Rourk

(57) ABSTRACT

A system for generating video data comprising a mobile radar system operating on a processor and configured to generate vertically tilted radar frame data for a plurality of vehicles. A mobile video system operating on a processor and configured to generate video data of the plurality of vehicles. A dynamic plane rotation system operating on a processor and coupled to the mobile radar system and configured to map the vertically tilted radar frame data onto a flat plane parallel to a roadway to generate mapped data.

25 Claims, 3 Drawing Sheets

(56) References Cited

OTHER PUBLICATIONS

Polcam Smart Eye Radar, Feb. 26, 2013.
Polcam, Smart Eye Radar Type Sauron, Users Guide, Feb. 2013.
Ramet, AD9C Radar Speed Camera, System Layout, Feb. 27, 2013.
Ramet, AD9C Car Trunk, Feb. 27, 2013.
Ramet, AD9C Dashboard and Tablet, Feb. 27, 2013.
Ramet, AD9C Dashboard Display, Feb. 27, 2013.
Ramet, AD9C Front Auto, Feb. 27, 2013.
Ramet,AD9C New Features, Feb. 27, 2013.
Ramet, AD9C Police Speed Camera Line, Feb. 27, 2013.
Ramet, AD9O Cabinet Block Diagram, Feb. 27, 2013.
Ramet, AD9O Container Block Diagram, Feb. 27, 2013.
Ramet, AD9O opened, Feb. 27, 2013.
Ramet, AD9O photo, Feb. 27, 2013.
Ramet, AD9O Police Speed Camera Line, Feb. 27, 2013.
Ramet, AD9T Radar Speed Camera, Block Diagram, Feb. 27, 2013.
Ramet, AD9T in Car Trunk, Feb. 27, 2013.
Ramet, AD9T on Tripod, Feb. 27, 2013.
Ramet, AD9T Travel Case, Feb. 27, 2013.
Ramet, AD9T with Tablet PC, Feb. 27, 2013.
Ramet, AD9T, Police Speed Camera Line, Feb. 27, 2013.
Ramet, Archly 45 screenshot, Feb. 27, 2013.
Ramet, Archly 45 Offence Report, Mar. 21, 2008.
Ramet, Archly 45, Police Speed Camera Line, Feb. 27, 2013.
Ramet, Police Speed Camera Line, Remote Transmission, Feb. 27, 2013.
Ramet, AD9 Remote Transmission Network Example.
Ramet, Police Speed Camera Line, AD9, Specs, Feb. 27, 2013.
Redflex Traffic Systems, REDFLEXspeed, 2012.
Sensys, SSS Fixed Speed Enforcement, Feb. 26, 2013.
Sensys, SSS Droplet Cabinet, Feb. 26, 2013.
Sensys, MSSS II, Feb. 26, 2013.
Isbak Product Documents; May 6, 2013.
Safran, MESTA 1000-1200, May 22, 2013.
http://www.oculii.com/VISDAR2000.php.
Simicon, KRIS-P Brochure, Feb. 12, 2013.
Simicon, Cordon Brochure, Feb. 4, 2013.
GATSO, Event Recorder, Jun. 17, 2013.
GATSO, FT1 Flash, Jun. 19, 2013.
GATSO, FT2 Flash, Jun. 19, 2013.
GATSO, GS Camera, Jun. 26, 2013.
GATSO, GT20 Camera, Jun. 26, 2013.
GATSO, GTC-GS11, Jun. 5, 2013.
GATSO, Loopless Trigger Radar, Sep. 26, 2013.
GATSO, Millia Brochure, Mar. 22, 2012.
GATSO, Parabolic Radar, Sep. 26, 2013.
GATSO, RS-GS11, Jun. 26, 2013.
GATSO, RT2 Radar, Oct. 7, 2013.
GATSO, RT3 Radar, Nov. 5, 2013.
GATSO, Statio Brochure, Mar. 22, 2012.
GATSOUSA, RT3 Radar, Apr. 26, 2013.
GATSO, Web Interface, Sep. 27, 2013.
GATSO Xilium Back Office Brochure, Mar. 22, 2012.

* cited by examiner

MOBILE RADAR AND VISUAL TRACKING COORDINATE TRANSFORMATION

RELATED APPLICATIONS

This application claims priority to U.S. Provisional Patent Application No. 61/934,680, filed Jan. 31, 2014, which is hereby incorporated by reference for all purposes as if set forth herein in its entirety.

TECHNICAL FIELD

The present application relates to vehicle speed detection, and more specifically to vehicle speed detection radar with associated video data indicators.

BACKGROUND OF THE INVENTION

Speed detection radar with video supplementation typically requires observation from a fixed location, in order to perform the complex calculations that are required to map the radar data to the video data. The fixed location allows inputs to be provided that do not have to be dynamically determined, but also limits the application of such speed detectors. For example, a mobile unit would not be able to be provided for handheld or patrol car applications, because such applications are not stationary, and it would be too difficult for police officers to program a unit with the required information to allow it to be used.

SUMMARY OF THE INVENTION

A system for generating video data is provided that includes a mobile radar system operating on a processor and configured to generate frames of radar data that include data for one or more vehicles. A mobile video system operating on a processor is configured to generate frames of video data that include speed data for one or more vehicles. A dynamic plane rotation system operating on a processor and coupled to the mobile radar system is configured to map the vertically tilted frames of radar data onto a flat plane parallel to a roadway to generate mapped data for one or more vehicles that includes the radar sped data displayed next to the location of the vehicle in the video data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
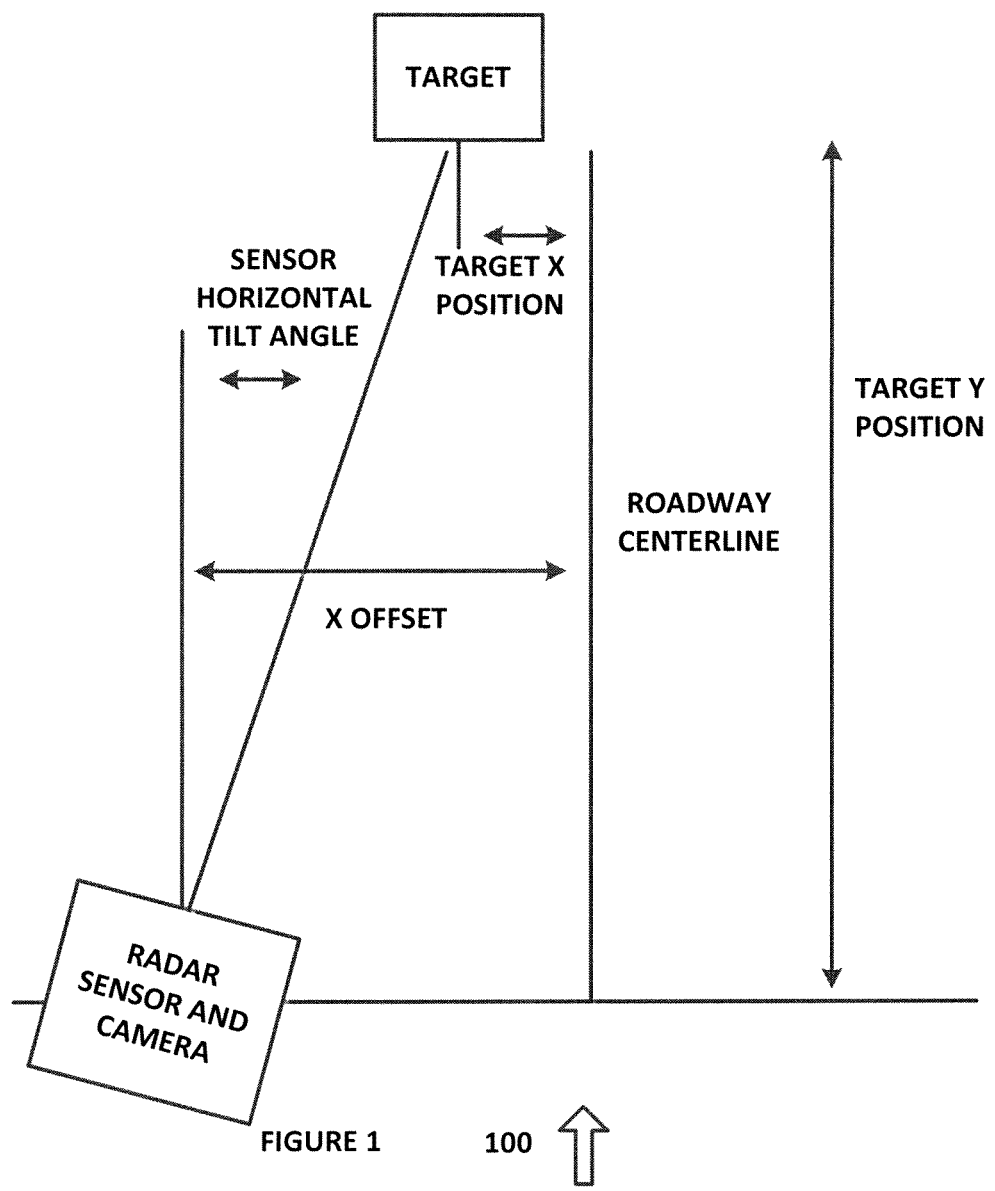
FIG. 1 is a diagram showing relative locations of a radar sensor and camera, a target and a roadway centerline, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram 100 showing relative locations of a radar sensor and camera, a target and a roadway centerline, in accordance with an exemplary embodiment of the present disclosure. Diagram 100 also shows the sensor horizontal tilt angle, the X offset of the sensor, the target X position and Y position, and other relevant data for an exemplary embodiment of the present disclosure.

In diagram 100, X dimensions to the right are positive, Y dimensions down the roadway towards the target are positive, and Z dimensions above the target elevation are positive. In addition,
Sensor X Offset=Xs
Sensor Horizontal Tilt Angle=θhs (Angle relative to Y axis)
Sensor Height Above Target=Zs
Sensor Vertical Tilt Angle=θvs Downward tilt is negative)
Target X Position=Xt
Target Y Position=Yt
Target X Velocity Component=Vxt (Defined as Vxt=d(Xt)/dt)
Target Y Velocity Component=Vyt (Defined as Vyt=d(Yt)/dt)
Camera Horizontal Field of View=FOVh (expressed in degrees)
Camera Vertical Field of View=FOVv (expressed in degrees)

Location 0,0 in the roadway frame of reference is the intersection of the roadway centerline with the baseline which is also aligned with the 0 distance reference of the radar.

It can be assumed that the radar sensor is a 3D sensor that is capable of resolving azimuth angle and distance in its frame of reference, but not elevation angle (a 4D sensor can alternatively be used to allow differences in elevation to be automatically detected and adjusted).

The camera can show a picture in the sensor and camera frame of reference that includes elevation information. There may be a small offset between the camera and sensor locations. This offset is likely not significant at the level of accuracy required for the purposes of this exemplary embodiment.

In order to project target information as seen by a radar speed detector sensor and camera onto a flat (roadway) plane, the signals in the radar speed detector frame of reference can first be described. A 3D radar speed detector does not generate elevation angle data (but a 4D radar speed detector will), such that signals in the radar speed detector frame of reference can be defined relative to a plane described by the intersection of the radar speed detector X axis and a line from the radar speed detector to the target. In order to compensate for differences in elevation between the sensor and the targets, a vertical offset can also be provided as part of a system setup procedure. Depending on the height and aiming direction of the sensor, this plane can be rotated both horizontally and tilted vertically relative to the roadway. A suitable 3D automotive radar sensor system is available from Smart Microwave Sensors GmbH of Niedersachsen, Germany. In general, tilting the 3D radar sensor system increases the amount of roadway that can be illuminated by the sensor.

The radar speed detector measures speed and distance in a frame of reference with the X axis parallel to the face of the radar speed detector and the Y axis in a plane parallel to a line from the radar speed detector to the target. This data can be mapped into the roadway frame of reference by three transformations. The first transformation can be used to map the vertically tilted radar speed detector frame onto a flat plane parallel to the roadway x and y axes. The second transformation can be used to rotate the flat-plane radar speed detector target representation into the radar speed detector frame of reference with the X axis parallel to the face of the radar speed detector and the Y axis perpendicular to the face of the radar speed detector. The third transformation can be used to rotate the radar speed detector frame of reference into the roadway frame of reference with the x and y axes parallel to the roadway x and y axes, and translate the radar data along the x axis to the roadway centerline. After these three transformations have been performed, the radar speed detector speed data can be mapped to the video data to identify the position of targets on the video and to generate a text overlay on the video data that shows the speed of targets in the video.

First, the vertical tilt of the target to the radar speed detector plane will be projected onto a plane parallel to the roadway (with θrr=0). Let:
Dr=direct path distance from the radar to the target,
θyr=target angle relative to the radar Y axis as seen by the radar,
θrr=vertical tilt angle of the radar to target plane, and
Yrr=Dr projected onto a flat plane parallel to the roadway plane.

Dr and θyr are data that is generated by the radar speed detector. θrr can be determined from Dr and Zs (specified as part of the system setup) as follows:

$$\theta rr=\sin^{-1}*(-Zs/Dr) \quad (1)$$

Because the X axis is perpendicular to the axis of rotation, the X coordinate is zero and the Y coordinate is the distance to the target. The Y coordinate is shortened by the cosine of the tilt angle:

$$Yrr=Dr*\cos(\theta rr) \quad (2)$$

To rotate the above into the radar speed detector frame of reference, let
Xrp=Offset of target along radar X axis perpendicular to radar centerline (perpendicular to face of the radar),
Yrp=Offset of target from face of radar in direction parallel to radar centerline, $$Xrp=Yrr*\sin(\theta yr)$$

$$Xrp=Dr*\sin(\theta yr) \quad (3)$$

$$Yrp=Yrr*\cos(\theta yr)$$

$$Yrp=Dr*\cos(\theta yr) \quad (4)$$

If the radar speed detector is reporting (X,Y) target coordinates, Xrp and Yrp will be the values reported.

Next, the radar speed detector frame of reference is rotated and translated to align with the roadway frame of reference. Let:
Θt=Target angle seen by radar rotated to roadway reference frame $$\theta t=\theta yr+\theta hs \quad (5)$$

Xrt=Target X coordinate relative to radar,
then $$Xrt=Yrr*\sin(\theta t)$$

$$Xrt=Dr*\cos(\theta rr)*\sin(\theta t),$$

and $$Xt=Xrt+Xs$$

$$Xt=(Dr*\cos(\theta rr)*\sin(\theta t))+Xs \quad (6)$$

$$Yt=Yrr*\cos(\theta t)$$

$$Yt=Dr*\cos(\theta rr)*\cos(\theta t) \quad (7)$$

Algorithms 1, 2, 5, 6 and 7 define the mapping of radar speed detector data into the roadway frame of reference. For the reverse mapping from the roadway frame of reference to the radar speed detector data, Xt, Yt, Xs, θhs, θvs and Zs are known. The mapping is then as follows. Let:
θt=angle of target relative to Y axis at radar position
Yrr=distance from radar to target in roadway plane $$\theta t=\tan-1*((Xt-Xs)/Yt) \quad (8)$$

$$Yrr=\text{SQRT}((Xt-Xs)^2+Yt^2) \quad (9)$$

When the radar speed detector sensor is rotated in the azimuth plane, the target angle as seen by the radar speed detector becomes:

$$\theta yr=-\theta hs+\theta t \quad (10)$$

and the target distance is unchanged.

When the sensor is elevated above the target, the target distance is increased and:

$$\theta rr=\tan^{-1}(-Zs/Yrr) \quad (11)$$

$$Dr=Yrr/\cos(\theta rr) \text{ or,} \quad (12)$$

$$Dr=\text{SQRT}(Yrr^2+Zs^2)$$

$$Dr=\text{SQRT}((Xt-Xs)^2 Yt^2+Zs^2) \quad (13)$$

The mapping of vehicle speed between the radar speed detector and roadway frames of reference follows different relationships than the mapping of position. In one exemplary embodiment, the radar speed detector is not able to directly resolve speed as measured by Doppler shift into X and Y velocity components, and the radar speed detector is only able to measure the component of speed in the direction of the radar speed detector, although other suitable embodiments can also or alternatively be used. This condition causes the measured speed to be low by an amount equal to the cosine of the angle between the target direction of travel and the straight-line path to the radar speed detector. Let:
Var=Apparent target speed as seen by the radar,
V=true target velocity, and
θr=angle between true target direction and angle to radar, then, $$Var=V*\cos(\theta r)$$

θr can further be resolved into a vertical component and a horizontal component. Let θv represent the vertical angle component and θh represent the horizontal angle component. Assuming the target is traveling on the roadway, θv can be determined from target and sensor positions and is identical to θrr in the previous derivations as given by algorithms (1) or (11) as appropriate. Then:

$$Var = V*\cos(\theta rr)*\cos(\theta h)$$

$$\theta v = \theta rr \quad (14)$$

$$Var = V*\cos(\theta rr)*\cos(\theta h) \quad (15)$$

θh cannot be determined from the Doppler speed information generated by the radar speed detector in this exemplary embodiment. However, the direction of travel can be estimated (at generally reduced accuracy) by observing the change in target position over time. In the radar speed detector frame of reference, this change in position can be expressed as:

$$Vxr = d/dt(Xrp) \text{ and} \quad (16)$$

$$Vyr = d/dt(Yrp), \quad (17)$$

where Xrp and Yrp are given by algorithms (3) and (4). Vxr and Vyr may be estimated with a minimum of two samples of Xrp and Yrp separated in time. This calculation is quite sensitive to errors in Xrp and Yrp and it is recommended to use a noise-reduction technique such as least-squares curve fitting with as many points as possible to reduce the effect of noise. With estimates for Vxr and Vyr, θh may be calculated from:

$$\theta h = \tan{-1}(Vxr/Vyr) \quad (18)$$

The true target velocity can then be calculated as:

$$V = Var/(\cos(\theta rr)*\cos(\theta h)) \quad (19)$$

$$Vxt = V*\sin(\theta h - \theta hs) \quad (20)$$

$$Vyt = V*\cos(\theta h - \theta hs) \quad (21)$$

If the radar speed detector is reporting polar coordinates (θh and Var), then Vxr and Vyr can be determined using the following algorithms:

$$Vxr = V*\sin(\theta h) \quad (22)$$

$$Vyr = V*\cos(\theta h) \quad (23)$$

The above algorithms map from the radar speed detector frame of reference to the roadway frame of reference, given target position and apparent speed from the radar speed detector. Mapping from the roadway frame of reference into the radar speed detector frame of reference can be determined by using the following algorithms:

$$V = SQRT(Vxt^2 + Vyt^2) \quad (24)$$

$$\theta h = \tan^{-1}(Vxt/Vyt) + \theta hs \quad (25)$$

The transformations for the video or still camera frame of reference can compensate for the perspective view that contains elevation information in addition to the azimuth information provided by the radar speed detector. The straight lines representing the roadway and target tracks converge to a point at infinite distance. This point can be characterized by having X (horizontal) and Z (vertical) coordinates as seen on the video. The location of this infinity point on the video can be determined by the camera horizontal (FOVh) and vertical (FOVv) fields of view and by the horizontal (θhs) and vertical (θvs) tilt angles of the camera (and sensor) relative to the roadway.

In order to simplify the analysis, the camera resolution can be ignored and the camera coordinates can be expressed as a fraction of the screen width and height, but other suitable analyses can also or alternatively be used. This analysis can be readily scaled onto the camera resolution by multiplying the screen fraction times the resolution. For convenience, the camera (0, 0) reference point can be taken as the center of the screen, with positive coordinates being up and to the right, and values of +/−1.0 representing the edges of the display. Note that graphics systems usually take the upper left of the screen as the (0,0) reference, with positive coordinates being down and to the right. The translation between these different coordinate systems can be performed in the following manner. A coordinate in the radar speed detector system can be translated into the graphics coordinates by:

$$Xgraphic = (0.5*Xanalysis + 0.5)*(\text{Horizontal Resolution} - 1),$$

and $$Zgraphic = (-0.5*Zanalysis + 0.5)*(\text{Vertical Resolution} - 1)$$

The infinity point for the roadway will appear in the video at the following coordinates (where the minus signs are used because rotating the camera in one direction causes the image to rotate in the opposite direction):

$$IRx = -2*\theta hs/FOVh \quad (26)$$

$$IRz = -2*\theta vs/FOVv \quad (27)$$

These algorithms are useful in the construction of the roadway boundaries as seen on the video.

The target horizontal angle data generated by the radar speed detection system can also be mapped directly onto the video in the same manner as the infinity point, except the sense of rotation is positive:

$$Tx = 2*\theta yr/FOVh \quad (28)$$

There is an error in using this method. The target angle seen by the radar speed detector is in the plane that includes the radar speed detector and target and is parallel to the X axis. This plane is generally sloped vertically, which causes distortion of the angle. The error is usually small unless the plane is sloped at an unusually large angle.

The z-axis mapping for a target cannot be determined directly from the radar speed detector data, because the radar speed detector does not provide elevation data, and instead involves mapping from a three-axis mapping of the target on the roadway onto the video. The general three-axis mapping can be performed as follows, or in other suitable manners.

Assume a target is located at position (Xt, Yt, Zt) relative to the roadway origin. With the radar speed detector offset from the roadway origin by (Xs, 0, Zs), the target will appear to be at (Xv, Yv, Zv) relative to the radar speed detector position:

$$Xvt = Xt - Xs$$

$$Yvt = Yt$$

$$Zvt = Zt - Zs$$

When the sensor is rotated in the horizontal plane (around the Z axis), the coordinates become:

$$Xvr = (Xvt)*\cos(-\theta hs) + (Yvt)*\sin(-\theta hs)$$

$$Xvr = (Xt - Xs)*\cos(-\theta hs) + (Yt)*\sin(-\theta hs)$$

$$Yvr = (Yvt)*\cos(-\theta hs) - (Xvt)*\sin(-\theta hs)$$

$$Yvr = (Yt)*\cos(-\theta hs) - (Xt - Xs)*\sin(-\theta hs)$$

$$Zvr=Zvt$$

$$Zvr=Zt-Zs$$

When the sensor is rotated in the vertical plane (around the rotated X axis), the coordinates become:

$$Xr=Xvr$$

$$Xr=(Xt-Xs)*\cos(-\theta hs)+(Yt)*\sin(-\theta hs) \quad (29)$$

$$Yr=(Yvr)*\cos(-\theta vs)+(Zvr)*\sin(-\theta vs)$$

$$Yr=[(Yt)*\cos(-\theta hs)-(Xt-Xs)*\sin(-\theta hs)]*\cos(-\theta vs)+(Zt-Zs)*\sin(-\theta vs)$$

$$Yr=(Yt)*\cos(-\theta hs)*\cos(-\theta vs)-(Xt-Xs)*\sin(-\theta hs)*\cos(-\theta vs)+(Zt-Zs)*\sin(-\theta vs) \quad (30)$$

$$Zr=(Zvr)*\cos(-\theta vs)-(Yvr)*\sin(-\theta vs)$$

$$Zr=(Zt-Zs)*\cos(-\theta vs)-[(Yt)*\cos(-\theta hs)-(Xt-Xs)*\sin(-\theta hs)]*\sin(-\theta vs)$$

$$Zr=(Zt-Zs)*\cos(-\theta vs)-(Yt)*\cos(-\theta hs)*\sin(-\theta vs)+(Xt-Xs)*\sin(-\theta hs)*\sin(-\theta vs) \quad (31)$$

The above (Xr, Yr, Zr) express the target position in a coordinate system where the X axis is parallel to the face of the radar speed detector and camera in a horizontal direction, the Z axis is parallel to the face of the radar speed detector and camera in a vertical direction, and the Y axis is perpendicular to the face of the radar speed detector and camera and appears as a single point on the video. Y coordinates do not map directly to the video, but cause X and Z coordinates to appear as angular displacements where:

$$\theta rx=Xr/Yr$$

$$\theta rz=Zr/Yr$$

These then scale onto the video as a function of the camera field of view:

$$Tx=2*\theta rx/FOVh$$

$$Tx=2*Xr/(Yr*FOVh) \quad (32)$$

$$Tz=2*\theta rz/FOVv$$

$$Tz=2*Zr/(Yr*FOVv) \quad (33)$$

Note that the above process may produce coordinates that are outside the +/− limits of the display. This is a correct result but such points cannot be shown on the display and must be eliminated to prevent invalid display coordinates.

There does not exist a general solution for mapping in reverse from the video perspective to a 3D representation because the Y coordinate is not present in the perspective view. Under limited circumstances with assumptions or a-priori knowledge, a reverse mapping may be possible.

Using the above algorithms, any point in the roadway can be mapped into the perspective. Of interest are points on the roadway itself, for example to draw lines representing the roadway centerline, lane dividers and curbs. Such lines can be constructed by choosing a near point on the roadway, such as points along the X axis with Y and Z coordinates=0, and mapping those into the video perspective. Then a line representing that roadway feature can be constructed by constructing a straight line through the near point and the roadway infinity point identified in algorithms (26) and (27). If Xn and Zn represent the coordinates of the near point on the perspective view, the algorithm of the line through the points is defined by:

$$(Z-Zn)/(IRz-Zn)=(X-Xn)/(IRx-Xn) \quad (34)$$

This algorithm can be used to solve for X given Z or Z given X.

Figure 2:
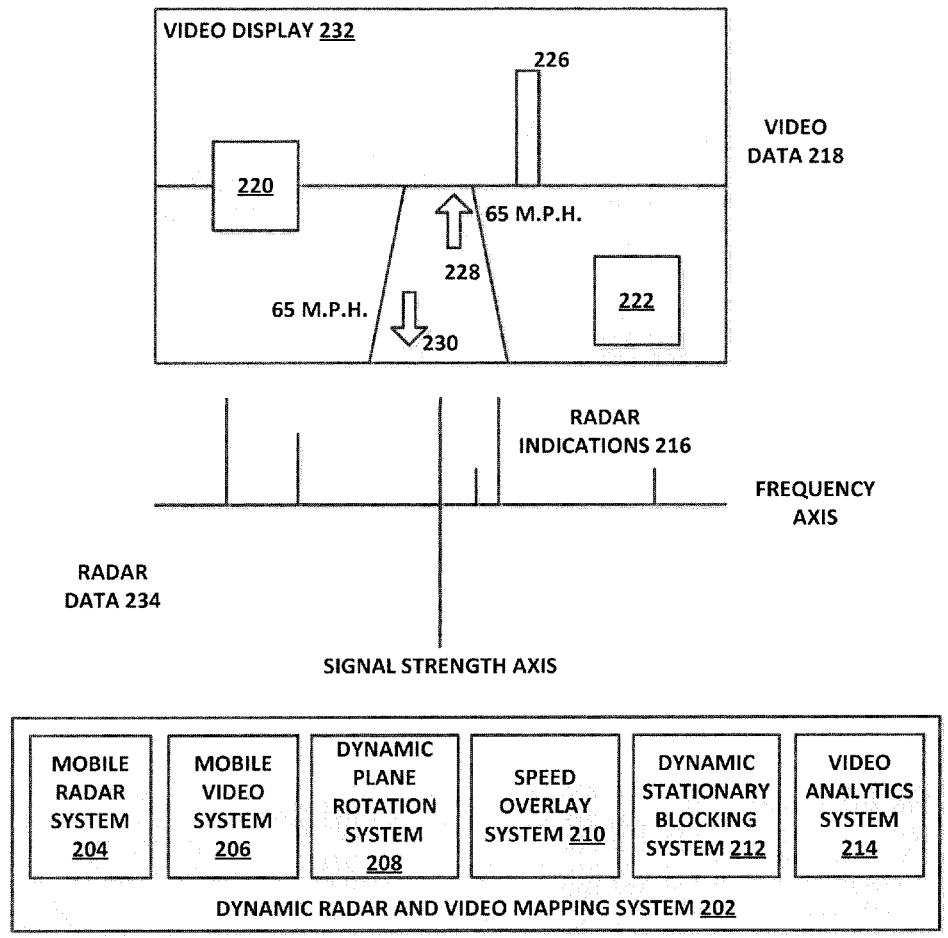
FIG. 2 is a diagram of a system for dynamic radar and video mapping in accordance with an exemplary embodiment of the present disclosure.
Figure 2:

FIG. 2 is a diagram of a system 200 for dynamic radar speed detector and video mapping in accordance with an exemplary embodiment of the present disclosure. System 200 includes dynamic radar and video mapping system 202, mobile radar system 204, mobile video system 206, dynamic plane rotation system 208, speed overlay system 210, dynamic stationary blocking system 212 and video analytics system 214, each of which can be implemented in hardware or a suitable combination of hardware and software, and which can include one or more software systems operating on a processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Dynamic radar and video mapping system 202 receives frames of video data 218 and frames of radar data 234 at a mobile unit and processes the frames of video data 218 and the frames of radar data 234 to generate a video display 232 that includes speed data superimposed over objects in the video that reflects the speed of the objects. The frames of radar data 234 can include radar indications 216 that are Fourier transform components in a frequency domain, where the signal strength, location and phase of the Fourier transform components in conjunction with suitable modulation of the transmitted radar signal can be used to determine a speed and distance of an object relative to the mobile unit. This radar speed detector data is then mapped to video data to generate a video display that includes a speed data overlay.

For example, if dynamic radar and video mapping system 102 is deployed on a law enforcement vehicle that is travelling at a lawful speed limit, such as 65 m.p.h., then vehicles that are travelling at the same speed and in the same direction as the law enforcement vehicle will appear to be stationary from the radar speed detector data and in the video data, other vehicles that are traveling at the legal speed limit and that are approaching the law enforcement vehicle will appear to be traveling at approximately twice the legal speed in the radar speed detector data and video data, and stationary objects will appear to be moving at the same speed as the law enforcement vehicle in the radar data and the video data. Dynamic radar and video mapping system 202 converts these speeds to speeds relative to a stationary observation point. As shown in video display 232, vehicle 228 is travelling in the same direction of travel as video display 232 at 65 m.p.h. and is shown in video display 132 with a 65 m.p.h. overlay, while vehicle 230 is travelling in the opposite direction and is shown with a speed of 65 m.p.h. Likewise, stationary objects 220, 222 and 226 are shown with no associated speed. Dynamic radar and video mapping system 202 thus not only maps the mobile radar speed detector data to mobile video data, but also prevents stationary objects from being inadvertently indicated as moving, and prevents vehicles that are approaching the mobile unit from being shown moving at a speed that is faster than their actual speed.

Mobile radar system 204 generates radar speed detector data from a moving or stationary mobile platform, such as a law enforcement vehicle. In this manner, mobile radar system 204 does not need to be stationary and located at a predetermined location to the side of the roadway, unlike prior art systems, because the mobile radar speed detector data is processed to compensate for movement.

Mobile video system 206 generates video data from a moving or stationary mobile platform, such as a law enforcement vehicle. In this manner, mobile video system 206 does not need to be stationary and located at a predetermined location to the side of the roadway, unlike prior art systems, because the mobile video data is processed to compensate for movement, such as with video analytics.

Dynamic plane rotation system 208 performs dynamic plane rotation processing of the radar speed detector data. In one exemplary embodiment, dynamic plane rotation system 208 can receive data that is directly generated by a radar speed detection system and can process the data based on additional data, such as data that defines the height of the radar speed detector system above the target.

Speed overlay system 210 receives vehicle speed data that has been mapped onto the video data and generates a text overlay that displays the speed near the associated moving object in the video data. In one exemplary embodiment, speed overlay system 210 corrects for speed based on direction of travel, such as to display the absolute speed of a vehicle relative to the surface of the roadway, as opposed to the speed of the vehicle relative to a vehicle that is equipped with dynamic radar and video mapping system 202. Speed overlay system 210 can also eliminate false target data, such as where radar target data and video target data do not correlate for a predetermined period of time, within a predetermined spatial accuracy or in other suitable manners, which can occur due to false target data being generated in the radar data or the video data. Speed overlay system 210 can also be used in either a dynamic or stationary system.

Dynamic stationary blocking system 212 blocks the speed generated by stationary objects relative to a vehicle that is equipped with dynamic radar and video mapping system 202. In one exemplary embodiment, objects such as buildings, signs, overpasses or other objects that have a radar profile can appear to be moving, such as when dynamic radar and video mapping system 202 is installed on a moving vehicle. Dynamic stationary blocking system 212 prevents speed data for such stationary items from being added to the video data.

Video analytics system 214 receives the video data and eliminates targets that are generated due to the motion of a vehicle on which system 200 is mounted, operator movement for a handheld system, or from other sources of error. In one exemplary embodiment, video analytics system 214 can identify vehicles that are moving within video data at a rate that is different from the movement of background images due to motion of the patrol vehicle, using one or more of the following processes:

by receiving speed data from an external system (vehicle speed sensing system, GPS, radar-based speed sensing) and using the speed data to extract objects within the image data that are stationary but which appear to be moving based on the patrol vehicle frame of reference;

by receiving data that identifies a vehicle heading and using the heading data to extract objects within the image data that are stationary but which appear to be moving based on the vehicle's heading and other data such as map data, or a change in the patrol vehicle's heading;

by receiving accelerometer data and using the accelerometer data to extract objects within the image data that are stationary but which appear to be moving based on the accelerometer data;

by processing the image data for content that can be used to identify targets, such as vehicle license plate data, vehicle outline data, reflection data, data that identifies a centerline and boundaries of a roadway, map data in conjunction with global positioning data, image data that characterizes stationary objects (such as buildings, signs or billboards), or other suitable data;

by processing the image data to identify objects that are moving at different rates within the image data, such as by using pixel brightness or color value changes for one or more adjacent pixels and comparing those changes with changes in other pixels or groups of pixels, to distinguish objects that are moving at a speed that is different from the speed of adjacent objects; or by using map data in conjunction with location data, heading data and other suitable data to identify objects in the image data.

Other suitable image data processing can also or alternatively be used. Objects identified by video analytics system 214 can be tracked from frame to frame, a tag can be associated with the objects for displaying data such as speed or license tag number, or other suitable processing can also or alternatively be used.

The above disclosure can be implemented using analog or digital Doppler radar, 3D or 4D radar speed detector system, or other suitable radar speed detector systems, and with digital video camera technology, analog video camera technology, LIDAR systems or other suitable systems. In one exemplary embodiment, a first digital signal processor can be used for radar signal processing and a second digital signal processor can be used for video digital signal processing, and a third digital signal processor can be used to map the radar speed detector digital signals to the video digital signals. Likewise, other suitable embodiments can also or alternatively be used.

Figure 3:
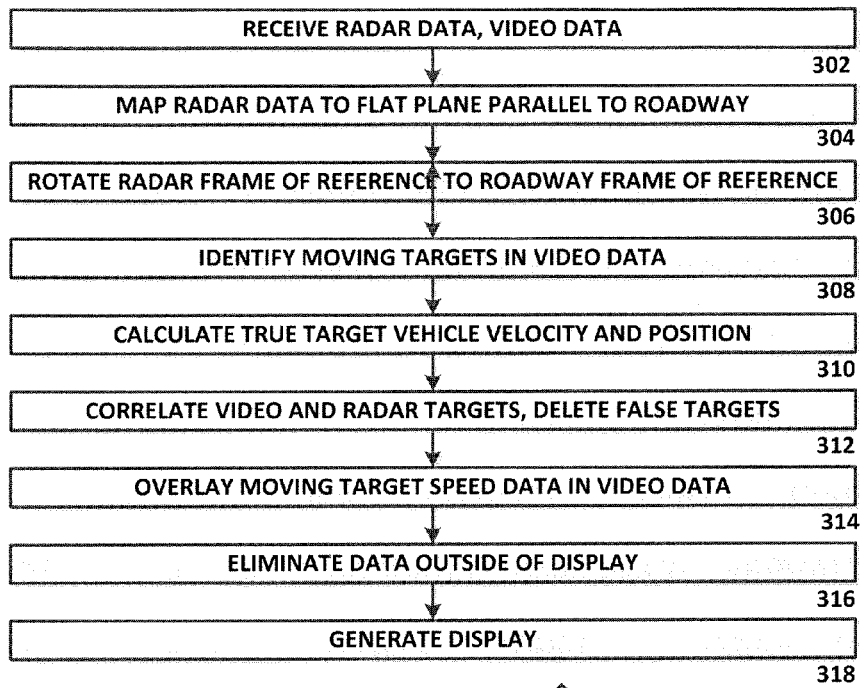
FIG. 3 is a diagram of an algorithm for dynamic radar and video mapping in accordance with an exemplary embodiment of the present disclosure.

FIG. 3 is a diagram of an algorithm 300 for dynamic radar and video mapping in accordance with an exemplary embodiment of the present disclosure. Algorithm 300 begins at 302, where radar speed detector data and video data are received. In one exemplary embodiment, the radar speed detector data and video data can be generated by a data processing system installed on a moving vehicle, or in other suitable manners, and can be transmitted over an internal bus structure, stored in a dynamic memory or otherwise provided to a processor. The algorithm then proceeds to 304.

At 304, the radar data is mapped to a flat plane parallel to the roadway. In one exemplary embodiment, algorithms (1) and (2) above or other suitable algorithms can be used, such as by executing a subroutine, by instantiating a thread or in other suitable manners. The algorithm then proceeds to 306.

At 306, the radar frame of reference data is rotated into a roadway frame of reference. In one exemplary embodiment, algorithms (5), (6) and (7) above or other suitable algorithms can be used, such as by executing a subroutine, by instantiating a thread or in other suitable manners. The algorithm then proceeds to 308.

At 308, moving targets are identified in the video data. In one exemplary embodiment, algorithms (16) and (17) above or other suitable algorithms can be used, such as by executing a subroutine, by instantiating a thread or in other suitable manners. Anti-jitter processing can be applied to the video data prior to identification of moving targets, such as to improve the accuracy and number of false targets that are identified. In addition, video analytics can also or alternatively be used to avoid false video target detection, such as by compensating for vehicle motion using image data from successive frames, by using vehicle speed data provided by an external system, by receiving vehicle heading data and compensating for changes in the video data caused by a change in the vehicle heading, by receiving accelerometer data and compensating for changes in the video data caused by acceleration, by detecting target vehicle signature data (such as license plate data, vehicle outline data, vehicle reflection data), by detecting a centerline and boundaries of a roadway in the video data using video analytics, by detecting an expected direction and location of a roadway based on Global Positioning System data, heading data and map data, or in other suitable manners. The algorithm then proceeds to 310.

At 310, the true target vehicle velocity and position is calculated. In one exemplary embodiment, algorithms (16), (17), (18), (19), (20), (21), (22) or (23) above or other suitable algorithms can be used, such as by executing a subroutine, by instantiating a thread or in other suitable manners. The algorithm then proceeds to 312.

At 312, the targets identified by video analysis are correlated with the targets identified by radar analysis, and any false targets are eliminated. In one exemplary embodiment, either or both of the video target identification process and the radar target identification process can result in the identification of false targets, such that the independent data from the other process can be used to eliminate false targets. A suitable threshold can be used to eliminate targets, such as when a correlation between the video target data and the radar target data does not occur for a predetermined period of time, for a predetermined number of frames of video data or radar data, or in other suitable manners. The algorithm then proceeds to 314.

At 314, radar speed data is overlaid onto the video data. In one exemplary embodiment, algorithms (26), (27), (28), (29), (30), (31), (32), (33) and (34) above or other suitable algorithms can be used, such as by executing a subroutine, by instantiating a thread or in other suitable manners. The algorithm then proceeds to 316.

At 316, data that would fall outside of the display is eliminated. In one exemplary embodiment, coordinates that exceed a calculated maximum and minimum screen coordinates are omitted, or other suitable processes can also or alternatively be used. The algorithm then proceeds to 318.

At 318, a video display is generated. In one exemplary embodiment, the mapped radar speed data and the video data are combined using a graphics processor or other suitable devices. The display can be "frozen," a "snapshot" of the display can be generated and used for evidentiary purposes, license plate data for a vehicle can be extracted and used to generate a citation file for storing evidence associated with the citation, or other suitable processes can also or alternatively be used to assemble the data into an evidentiary record for use in a citation or for other suitable purposes.

In operation, algorithm 300 allows radar speed data and video data from a mobile source to be mapped onto a video display, so as to generate numerical speed indications onscreen in locations that are adjacent to the associated vehicles that are associated with the radar data. Algorithm 300 thus allows mobile vehicles to obtain evidentiary image and numeric speed data that can be calibrated and used as evidence. While algorithm 300 has been shown as a flowchart, a state diagram, object-oriented programming techniques or other suitable implementations of algorithm 300 can also or alternatively be used.

Figure 4:
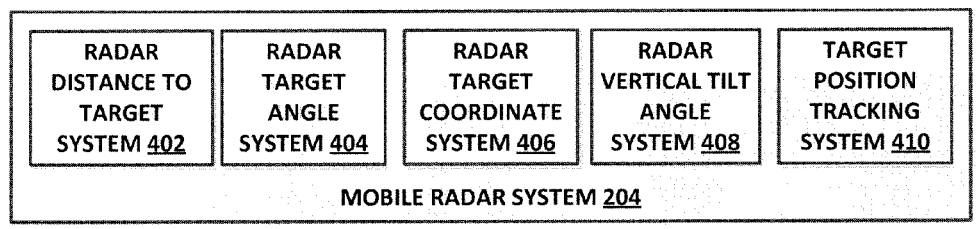
FIG. 4 is a diagram of a radar data processing system in accordance with an exemplary embodiment of the present disclosure.

FIG. 4 is a diagram of a radar data processing system 400 in accordance with an exemplary embodiment of the present disclosure. Radar data processing system 400 includes mobile radar system 204 and radar distance to target system 402, radar target angle system 404, radar target coordinate system 406, radar vertical tilt angle system 408 and target position tracking system 410, each of which can be implemented in hardware or a suitable combination of hardware and software, and which can be one or more software systems operating on a processor.

Radar distance to target system 402 receives data from a radar speed detection system and generates data that identifies the distance from the radar speed detection system to a target. In one exemplary embodiment, radar distance to target system 402 can receive input data as disclosed herein, such as from one or more data registers, or other suitable input data and can generate Dr or other suitable data for use in algorithms (1) through (34).

Radar target angle system 404 receives data from a radar speed detection system and generates data that identifies the target angle relative to the Y axis of the radar speed detection system. In one exemplary embodiment, radar target angle system 404 can receive input data as disclosed herein, such as from one or more data registers, or other suitable input data and can generate θyr or other suitable data for use in algorithms (1) through (34).

Radar target coordinate system 406 receives data from a radar speed detection system and generates data that identifies the target coordinates of targets identified by the radar speed detection system. In one exemplary embodiment, radar target coordinate system 406 can receive input data as disclosed herein, such as from one or more data registers, or other suitable input data and can generate Xt and Yt, or other suitable data for use in algorithms (1) through (34).

Radar vertical tilt angle system 408 receives data from a radar speed detection system and generates data that identifies the vertical tilt angle of the radar speed detection system to the roadway plane. In one exemplary embodiment, radar vertical tilt angle system 408 can receive input data as disclosed herein, such as from one or more data registers, or other suitable input data and can generate θrr or other suitable data for use in algorithms (1) through (34).

Target position tracking system 410 estimates a direction of travel from data that defines a change in target position over time. In one exemplary embodiment, target position tracking system 410 can receive input data as disclosed herein, such as from one or more data registers, or other suitable input data and can generate Vxr and Vyr of algorithms (16) and (17) or other suitable data.

In operation, radar data processing system 400 receives radar data from a mobile source and generates data for use in mapping the radar data to video data. Radar data processing system 400 thus allows mobile radar data to be used to generate evidentiary displays that include video data overlaid with numeric speed data, and which can be generated from a moving patrol vehicle or other mobile systems, and allows target positions on video to be compared with target positions from radar data to allow false targets in either the video or radar data to be eliminated.

Figure 5:
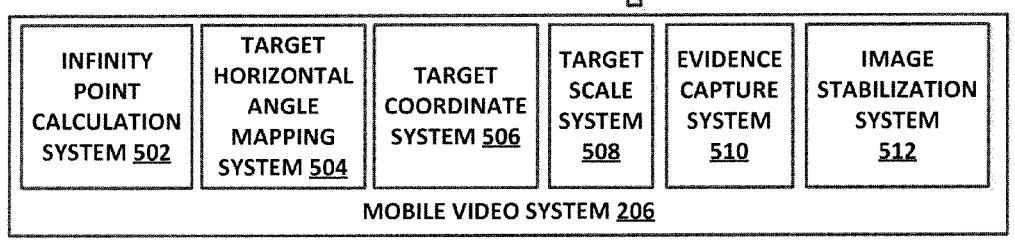
FIG. 5 is a diagram of a video data processing system in accordance with an exemplary embodiment of the present disclosure.

FIG. 5 is a diagram of a video data processing system 500 in accordance with an exemplary embodiment of the present disclosure. Video data processing system 500 includes mobile video system 206 and infinity point calculation system 502, target horizontal angle mapping system 504, target coordinate system 506, target scale system 508, evidence capture system 510 and image stabilization system 512, each of which can be implemented in hardware or a suitable combination of hardware and software, and which can be one or more software systems operating on a processor.

Infinity point calculation system 502 generates infinity point data from setup parameters. In one exemplary embodiment, infinity point calculation system 502 can receive input data as disclosed herein, such as from one or more data registers, or other suitable input data and can generate IRx and IRz of algorithms (26) and (27) or other suitable data.

Target horizontal angle mapping system 504 maps target horizontal angle data generated by a radar speed data processing system onto video data. In one exemplary embodiment, target horizontal angle mapping system 504 can receive input data as disclosed herein, such as from one or more data registers, or other suitable input data and can generate Tx of algorithm (28) or other suitable data.

Target coordinate system 506 can receive input data as disclosed herein, such as from one or more data registers, or other suitable input data and can generate target position data in a coordinate system where the X axis is parallel to the face of the radar and camera in a horizontal direction, the Z axis is parallel to the face of the radar and camera in a vertical direction, and the Y axis is perpendicular to the face of the radar and camera and appears as a single point on the video, or other suitable data. In one exemplary embodiment, target coordinate system 406 can receive input data as disclosed herein, such as from one or more data registers, or other suitable input data and can generate (Xr, Yr, Zr) of algorithms (29), (30) and (31), or other suitable data.

Target scale system 508 scales angular displacements of X and Z coordinates onto video data as a function of the camera field of view. In one exemplary embodiment, target scale system 508 can receive input data as disclosed herein, such as from one or more data registers, or other suitable input data and can generate Tx and Tz of algorithms (32) and (33) or other suitable data.

Evidence capture system 510 generates one or more user controls for generating screen shots, video clips or other suitable data for use as evidence. In one exemplary embodiment, evidence capture system 510 can be configured to facilitate use by an officer of a patrol vehicle while the vehicle is being driven, such as to generate an audible alert and to automatically start recording video when numeric speed data that is displayed on a video screen is above a predetermined speed, to allow the officer to initiate video recording with a spoken command or using a control that is disposed on a steering wheel or in other suitable manners. Additional controls can be used to initiate a violation record, such as by automatically opening a violation file for a vehicle based on license plate recognition data that has been extracted from the video data and by automatically associating video data with the violation file that includes the license plate data in a profile, as well as other data from a motor vehicle database, if the vehicle is present in the video data. Evidence capture system 510 can also include one or more user controls to allow still image or video data to be transferred over a wireless data connection to a computer, such as to allow an officer to show the video data to the driver of a vehicle, or other suitable user controls can also or alternatively be provided.

Image stabilization system 512 receives video data and performs image stabilization processing on the video data. In one exemplary embodiment, image stabilization system 512 can perform anti-jitter processing of the video data to eliminate effects caused by shaking in a hand-held unit, such as by digital image stabilization, with stabilization filters or in other suitable manners. Accelerometer data, vehicle speed data or other suitable data can also or alternatively be used as input for image stabilization processing. Image stabilization system 512 can also or alternatively utilize lens-based image stabilization, sensor shift image stabilization or other mechanical image stabilization.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for generating evidentiary data comprising:
receiving digital data that represents radar data and video data at a processor that includes a plurality of target vehicles;
mapping the radar data to a flat plane parallel to the roadway with a processor;
rotating the mapped data into a radar frame of reference;
generating digital data representing a speed of each of the plurality of target vehicles; and
generating a display that includes the speed of each of the plurality of target vehicles in the video data adjacent to an image of each of the plurality of target vehicles;
wherein rotating the mapped data in the radar frame of reference to the roadway frame of reference comprises calculating:

$$\theta t = \theta yr + \theta hs,$$

where
$\theta yr$ = a target angle relative to a radar Y axis, and
$\theta hs$ = a radar angle relative to the radar Y axis.

2. The method of claim 1 further comprising rotating the mapped data in the radar frame of reference to a roadway frame of reference.

3. The method of claim 1 further comprising identifying moving targets in the video data.

4. The method of claim 1 further comprising calculating a true target velocity for each of the plurality of target vehicles.

5. The method of claim 1 further comprising eliminating the digital data representing the speed of one of the plurality of target vehicles that is outside of a field of view of the video data.

6. The method of claim 1 wherein mapping the radar data to the flat plane parallel to the roadway with the processor comprises calculating:

$$\theta rr = \sin^{-1}*(-Zs/Dr),$$

where
Zs=a height of a radar system above a target, and
Dr=a distance of the radar system to a target.

7. The method of claim 1 wherein rotating the mapped data into the radar frame of reference comprises calculating:

$$Xrp=Dr*\sin(\theta yr), \text{ and}$$

$$Yrp=Dr*\cos(\theta yr),$$

where
Dr=a distance of the radar system to a target, and
Θyr=a target angle relative to a radar Y axis.

8. The method of claim 1 further comprising calculating:

$$V=Var/(\cos(\theta rr)*\cos(\theta h))$$

where
Var=apparent target speed as seen by the radar,
θrr=vertical tilt angle of the radar to target plane, and
θh=horizontal component of the angle between the target direction of travel and the path from the radar to the target.

9. In a system for generating evidentiary data that includes a mobile radar system operating on a processor and configured to generate vertically tilted radar frame data for a plurality of vehicles, a mobile video system operating on a processor and configured to generate video data of the plurality of vehicles, a dynamic plane rotation system operating on a processor and coupled to the mobile radar system and configured to map the vertically tilted radar frame data onto a flat plane parallel to a roadway to generate mapped data, a dynamic speed overlay system configured to receive the mapped mobile radar data and to display numerical speed data corresponding to a corresponding vehicle in the video data, a radar distance to target system configured to generate digital data that represents a distance between the mobile radar system and each of a plurality of targets, a radar target angle system configured to generate digital data that represents an angle between a reference line of the mobile radar system and each of a plurality of targets, a radar vertical tilt angle system configured to generate digital data that represents a vertical tilt angle of the mobile radar system to a target plane, a target position tracking system configured to generate digital data that represents a change in target position over time, an infinity point calculation system configured to generate digital data that represents an infinity point for a roadway, a target horizontal angle mapping system configured to generate digital data that represents a radar target horizontal angle mapped onto the video data, a target coordinate system configured to generate digital data that represents a coordinate of a radar target in the video data, a target scale system configured to generate digital data that represents a radar target in a field of view of the video data, and an evidence capture system configured to receive one or more user commands and to generate data for use in processing a citation, a method for generating video data comprising:

receiving digital data that represents radar data and video data at a processor that includes a plurality of target vehicles;

mapping the radar data to a flat plane parallel to the roadway with a processor by calculating:

$$\theta rr=\sin-1*(-Zs/Dr),$$

where
Zs=a height of a radar system above a target, and
Dr=a distance of the radar system to a target;

rotating the mapped data into a radar frame of reference by calculating:

$$Xrp=Dr*\sin(\theta yr), \text{ and}$$

$$Yrp=Dr*\cos(\theta yr),$$

where
Θyr=a target angle relative to a radar Y axis;
rotating the mapped data in the radar frame of reference to a roadway frame of reference by calculating:

$$\theta t=\theta yr+\theta hs,$$

where
θyr=a target angle relative to a radar Y axis, and
θhs=a radar angle relative to the roadway Y axis;
identifying moving targets in the video data;
calculating a true target velocity for each of the plurality of target vehicles;
generating digital data representing a speed of each of the plurality of target vehicles;
eliminating the digital data representing the speed of one of the plurality of vehicles that is outside of a field of view of the video data;
eliminating the digital data representing the speed of one of the plurality of vehicles that does not have a corresponding target in the video data; and
generating a display that includes the speed of each of the plurality of target vehicles in the video data adjacent to an image of each of the plurality of target vehicles.

10. A method for generating evidentiary data comprising:
receiving digital data that represents radar data and video data at a processor that includes a plurality of target vehicles;
mapping the radar data to a flat plane parallel to the roadway with a processor;
rotating the mapped data into a radar frame of reference;
generating digital data representing a speed of each of the plurality of target vehicles;
generating a display that includes the speed of each of the plurality of target vehicles in the video data adjacent to an image of each of the plurality of target vehicles; and
calculating:

$$V=Var/(\cos(\theta rr)*\cos(\theta h))$$

where
Var=apparent target speed as seen by the radar,
θrr=vertical tilt angle of the radar to target plane, and
θh=horizontal component of the angle between the target direction of travel and the path from the radar to the target.

11. The method of claim 10 further comprising rotating the mapped data in the radar frame of reference to a roadway frame of reference.

12. The method of claim 10 further comprising identifying moving targets in the video data.

13. The method of claim 10 further comprising calculating a true target velocity for each of the plurality of target vehicles.

14. The method of claim 10 further comprising eliminating the digital data representing the speed of one of the plurality of target vehicles that is outside of a field of view of the video data.

15. The method of claim 10 wherein mapping the radar data to the flat plane parallel to the roadway with the processor comprises calculating:

$$\theta rr=\sin-1*(-Zs/Dr),$$

where
- Zs=a height of a radar system above a target, and
- Dr=a distance of the radar system to a target.

16. The method of claim 10 wherein rotating the mapped data into the radar frame of reference comprises calculating:

$$Xrp = Dr * \sin(\theta yr), \text{ and}$$

$$Yrp = Dr * \cos(\theta yr),$$

where
- Dr=a distance of the radar system to a target, and
- Θyr=a target angle relative to a radar Y axis.

17. The method of claim 10 wherein rotating the mapped data in the radar frame of reference to the roadway frame of reference comprises calculating:

$$\theta t = \theta yr + \theta hs,$$

where
- θyr =a target angle relative to a radar Y axis, and
- θhs =a radar angle relative to the radar Y axis.

18. The method of claim 10 further comprising:
rotating the mapped data in the radar frame of reference to a roadway frame of reference; and
identifying the plurality of target vehicles in the video data.

19. The method of claim 10 further comprising:
identifying the plurality of target vehicles in the video data; and
calculating a true target velocity for each of the plurality of target vehicles.

20. The method of claim 10 further comprising:
identifying the plurality of target vehicles in the video data; and
eliminating the digital data representing the speed of one of the plurality of target vehicles that is outside of a field of view of the video data.

21. The method of claim 1 further comprising identifying the plurality of target vehicles in the video data.

22. The method of claim 10 further comprising identifying the plurality of target vehicles in the video data.

23. The method of claim 1 further comprising:
rotating the mapped data in the radar frame of reference to a roadway frame of reference; and
identifying the plurality of target vehicles in the video data.

24. The method of claim 1 further comprising:
identifying the plurality of target vehicles in the video data; and
calculating a true target velocity for each of the plurality of target vehicles.

25. The method of claim 1 further comprising:
identifying the plurality of target vehicles in the video data; and
eliminating the digital data representing the speed of one of the plurality of target vehicles that is outside of a field of view of the video data.

* * * * *